(12) United States Patent
Bailey Noval et al.

(10) Patent No.: US 10,371,049 B2
(45) Date of Patent: Aug. 6, 2019

(54) AIRCRAFT HYBRID ENGINE HAVING GEAR RING ENCASED FANS

(71) Applicant: Airbus Operations S.L., Getafe (ES)

(72) Inventors: Nicolas Bailey Noval, Getafe (ES); Raul Llamas Sandin, Getafe (ES)

(73) Assignee: Airbus Operations S.L., Getafe (ES)

( * ) Notice: Subject to any disclaimer, the term of this patent is extended or adjusted under 35 U.S.C. 154(b) by 741 days.

(21) Appl. No.: 14/856,834

(22) Filed: Sep. 17, 2015

(65) Prior Publication Data

US 2016/0076446 A1 Mar. 17, 2016

(30) Foreign Application Priority Data

Sep. 17, 2014 (EP) .................................. 14382349

(51) Int. Cl.
 *F02K 3/077* (2006.01)
 *F02C 6/14* (2006.01)
 (Continued)

(52) U.S. Cl.
 CPC .................. *F02C 6/14* (2013.01); *F02C 6/20* (2013.01); *F02C 6/206* (2013.01); *F02K 3/06* (2013.01);
 (Continued)

(58) Field of Classification Search
 CPC .. F02C 3/107; F02C 3/113; F02C 6/14; F02C 6/20; F02C 6/206; F02C 7/32; F02C 7/36; F02K 3/06; F02K 3/065; F02K 3/072; F02K 3/077; F02K 3/12; F02K 5/00; F05D 2220/323; F05D 2220/64; F05D 2220/76; B64D 27/10; B64D 27/12; B64D 27/14; B64D 27/16; B64D 27/18; B64D 27/20;
 (Continued)

(56) References Cited

U.S. PATENT DOCUMENTS 3,153,907 A * 10/1964 Griffith ................. B64C 29/005
 244/55
3,442,082 A * 5/1969 Peterson ................... F02K 3/12
 60/224

(Continued)

FOREIGN PATENT DOCUMENTS

FR 3009028 B1 * 8/2015 ............. F02K 3/072

OTHER PUBLICATIONS

European Search Report, dated Mar. 26, 2015.

*Primary Examiner* — Jason H Duger
(74) *Attorney, Agent, or Firm* — Greer, Burns & Crain Ltd.

(57) ABSTRACT

A propulsion engine comprising at least a first propulsion unit including a first fan encased by a geared ring and a gas turbine engine driving a first shaft connected to the first fan, at least a second propulsion unit including a second fan encased by a geared ring connected to a second shaft operatively coupled to an electric machine and at least an electric storage device connected to the electric machine. The geared rings are configured to transmit torque between the fans so that they can rotate in conjunction (directly or through an intermediate gear) when they are driven by at least one of said first and second shafts. The propulsion engine is arranged for controlling the torque to be supplied to the assembly of the first and second fans by the gas turbine engine and/or by the electric machine acting as a motor or as a generator.

12 Claims, 3 Drawing Sheets

(51) Int. Cl.
*F02C 6/20* (2006.01)
*F02K 3/06* (2006.01)
*F02K 5/00* (2006.01)

(52) U.S. Cl.
CPC .......... *F02K 5/00* (2013.01); *F05D 2220/323* (2013.01); *F05D 2220/64* (2013.01); *F05D 2220/76* (2013.01)

(58) Field of Classification Search
CPC .. B64D 27/24; B64D 2027/026; B64D 33/02; B64D 35/00; B64D 35/02; B64D 35/04; B64D 35/06; B64D 35/08; B64D 2033/0286; B64D 41/00; B64D 41/002; B64D 41/007
USPC .................................. 290/4 R, 4 C, 40 C, 51
See application file for complete search history.

(56) References Cited

U.S. PATENT DOCUMENTS

| | | | | |
|---|---|---|---|---|
| 3,643,439 | A | * | 2/1972 | Petersen .................. F02K 3/12 244/15 |
| 4,149,374 | A | * | 4/1979 | Barchenko ................ F02C 7/36 60/225 |
| 8,015,796 | B2 | * | 9/2011 | Babu ..................... F01D 13/003 60/226.1 |
| 8,324,746 | B2 | | 12/2012 | Bradbrook |
| 8,402,740 | B2 | * | 3/2013 | Guemmer ............. B64D 27/12 244/53 R |
| 8,596,036 | B2 | | 12/2013 | Hyde et al. |
| 9,188,083 | B2 | * | 11/2015 | Kupratis .................. F02K 3/12 |
| 2006/0185346 | A1 | | 8/2006 | Rolt |
| 2006/0254255 | A1 | | 11/2006 | Okai et al. |
| 2016/0076444 | A1 | * | 3/2016 | Bailey Noval ......... F02C 3/107 415/68 |

* cited by examiner

AIRCRAFT HYBRID ENGINE HAVING GEAR RING ENCASED FANS

CROSS-REFERENCES TO RELATED APPLICATIONS

This application claims the benefit of the European patent application No. 14382349.0 filed on Sep. 17, 2014, the entire disclosures of which are incorporated herein by way of reference.

FIELD OF THE INVENTION

This invention relates to propulsion engines and more particularly to hybrid engines for commercial aircraft.

BACKGROUND OF THE INVENTION

Fuel efficiency and more use of electric power are current trends in the aeronautical industry for commercial, military and utility aircraft, including unmanned air systems.

The fuel efficiency of conventional turbofan engines has improved significantly through the increase of the by-pass ratio, leading to engines of very large diameter which complicate their integration in the aircraft. The maximum power of conventional turbofan engines is generally determined by take-off or end of climb requirements and therefore the engine core is oversized for cruise.

The rapid development of more efficient and capable electric motors and batteries has prompted substantial research into the application of electric propulsion to aerospace vehicles.

Given the large variation of power required in the different phases of flight, various proposals have been made to use a combination of electric and thermal engines for take-off and climb and purely electric flight for the cruise phase, which requires substantially less power. The most common arrangement of hybrid propulsion systems is to use the thermal engine to drive an electrical generator to supplement the electrical power supplied by the batteries to the electric motors which drive fans or propellers.

U.S. Pat. No. 8,324,746 discloses a hybrid engine comprising a jet engine arranged for the transmission of torque to a rotor (whether a fan or a propeller) by means of a shaft, an electric generator arranged to be driven by said shaft and an electric motor arranged to be driven by the output of said generator for selective application of torque to the rotor and a clutch arranged in the path between the shaft and primary rotor selectively operable to mechanically disconnect the shaft from torque transmission with the rotor such that the rotor can be driven by any combination of the turbine and/or the electric motor.

U.S. Pat. No. 8,596,036 discloses a hybrid propulsive engine comprising a jet engine and a device for extracting energy at least partially in the form of electric power from the jet engine and converting at least a portion of the electric power to torque in an electric motor to drive a rotor.

A disadvantage of these hybrid engines is that they require a specific and powerful generator on the jet engine to drive the electric motor. Another undesirable characteristic is that the electric motors must be able to produce all the thrust even for the flight regimes requiring the maximum power and are, therefore, oversized for the cruise condition.

SUMMARY OF THE INVENTION

The invention provides a propulsion engine comprising at least a first propulsion unit including a first fan encased by a geared ring and a gas turbine engine driving a first shaft connected to the first fan, at least a second propulsion unit including a second fan encased by a geared ring connected to a second shaft operatively coupled to an electric machine and at least an electric storage device connected to the electric machine. The geared rings are configured to transmit torque between the fans so that they can rotate in conjunction when they are driven by at least one of said first and second shafts. The electric machine of the second propulsion unit is arranged for actuating, in combination with the electric storage device, whether as an electric motor extracting energy from the electric storage device to drive the second shaft or as an electric generator extracting the mechanical energy of the second shaft when it is driven by the second fan to charge the electric storage device. The propulsion engine also comprises a controller connected to the gas turbine engine, to the electric machine and to the electric storage device for controlling the torque to be supplied to the assembly of the first and second fans by the gas turbine engine and/or by the electric machine acting as a motor and for controlling the charge of the electric storage device by the electric machine acting as an electric generator.

In an embodiment, the propulsion engine also comprises an intermediate gear between the first and second fans to transmit the torque between them, the intermediate gear being connected to a linear actuator for engaging/disengaging the mechanical connection between the first and second fans. Its disengaging may be needed in case of, for instance, a mechanical failure of one of the fans.

In an embodiment, the propulsion engine also comprises at least a third propulsion unit including a third fan encased by a geared ring arranged to rotate in conjunction with the first and second fans of the first and second propulsion units.

The propulsion engine of the invention is particularly intended for aircraft but can also be used by other vehicles.

Other characteristics and advantages of the present invention will be clear from the following detailed description of embodiments illustrative of its object in relation to the attached figures.

DETAILED DESCRIPTION OF THE PREFERRED EMBODIMENTS

Figure 1A:
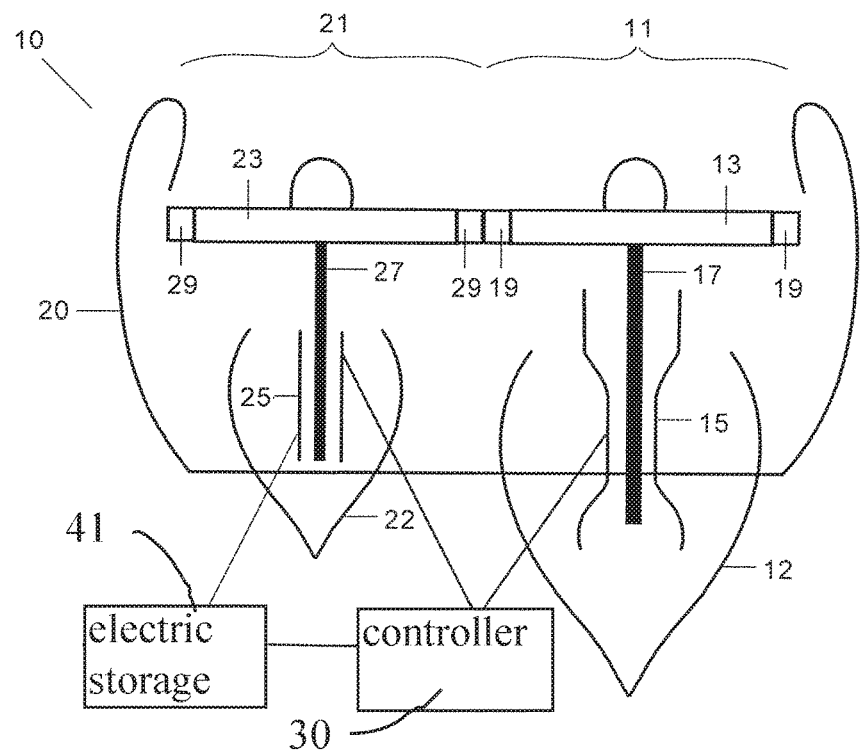
FIGS. 1a and 1b are, respectively, schematic plan and frontal views illustrating an embodiment of the hybrid engine of the invention with two propulsion units.
Figure 1B:
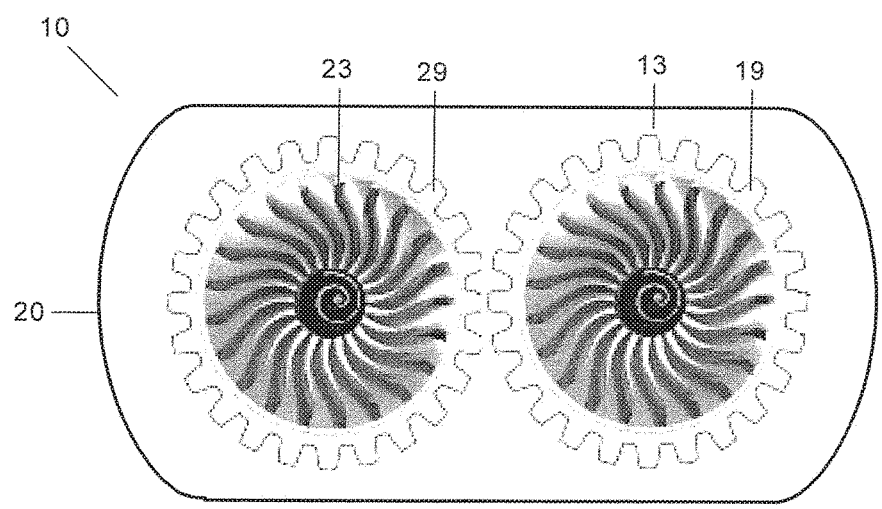

In the embodiment shown in FIGS. 1a and 1b, the propulsion engine 10 is a multi-fan engine housed in a nacelle 20 comprising:

A propulsion unit 11 in the right side having a first fan 13 encased by a geared ring 19 and a combustion engine 15 housed in a fairing 12 including at least a compressor, a combustion chamber and a turbine driving a first shaft 17 connected to the first fan 13.

A second propulsion unit 21 in the left side having a second fan 23 encased by a geared ring 29 connected to a second shaft 27. The second shaft 27 is also coupled to an electric machine 25 housed in a fairing 22 and connected to an electric storage device 41, such as a battery, located externally to the fairing 22.

A controller 30 for controlling the operation of the propulsion engine 10.

As the first and second fans 13, 23 of the first and second propulsion units 11, 21 are coupled mechanically through the geared rings 19, 29 both fans 13, 23 provide thrust when the combustion engine 15 or the electric machine 25 or both are delivering power. No direct electric connection is required between the combustion engine 15 and the electric machine 25 and no specific generator is required in the combustion engine 15. The electric machine 25 can act in a reversible way as a motor to drive the second shaft 27 or as a generator to charge the electric storage device 41 driven by the power from the combustion engine or by the free rotation of the fans under aerodynamic forces in the descent phases of the flight.

The electric storage device 41 may be also connected to the electric power system of the aircraft if it is envisaged that the production of electric power in the second propulsion unit 21 can be greater than the consumption. As is well known, there is an increased demand for electric power in aircraft as a consequence of substitutions of conventional equipment which depend on pneumatic, mechanic and hydraulic power by equipment that depend on electric power which provide a better system performance due to increase of reliability, less maintenance, and efficiency of energy.

The controller 30 is configured and arranged for operating the propulsion engine 10 in one of the following operation modes.

In a first mode of operation the propulsion engine 10 is actuated by the combustion engine 15 and the electric machine 25. The assembly of the first and second fans 13, 23 is driven by the torque provided by the first shaft 17 and the second shaft 27 to produce thrust. The electric machine 25 acts as an electric motor fed by the electric storage device 41 to drive the second shaft 27. This mode of operation would be used in all flight conditions requiring a high thrust.

In a second mode of operation, the propulsion engine 10 is actuated by, only, the combustion engine 15. The assembly of the first and second fans 13, 23 is driven by the torque provided by the first shaft 17 to produce thrust. On the other hand the mechanical energy of the second shaft 27, driven by the second fan 23, is converted into electric energy by the electric machine 25, acting as an electric generator, and stored in the electric storage device 41. This mode of operation would be used when the electric storage device 41 needs to be charged and the flight conditions do not require an extra-thrust provided by the electric machine 25 acting as a motor.

In a third mode of operation, the propulsion engine 10 is actuated by, only, the electric machine 25. The assembly of the first and second fans 13, 23 is driven by the torque provided by the second shaft 27 to produce thrust. The electric machine 25 acts as an electric motor fed by the electric storage device 41 to drive the second shaft 27. This mode of operation, which is also a more silent mode, would be used in those flight conditions not requiring the thrust provided by the combustion engine 15—for example in cruise and final approach conditions—and when the electric storage device 41 has a suitable level of charge.

In a fourth mode of operation the combustion engine 15 and the electric machine 25 are in power off mode, i.e., not delivering power to their respective fans 13, 23. The assembly of the first and second fans 13, 23 is driven by, only, the incoming air and the mechanical energy of the second shaft 27 driven by the second fan 23 is converted into electric energy by the electric machine 25, acting as an electric generator, and stored in the electric storage device 41. This mode of operation would be used to charge the electric storage device 41 in flight conditions not requiring the propulsion engine 10. In this mode of operation the propulsion engine 10 can therefore be used as a source of energy to perform the function of a Ram Air Turbine.

Figure 1C:
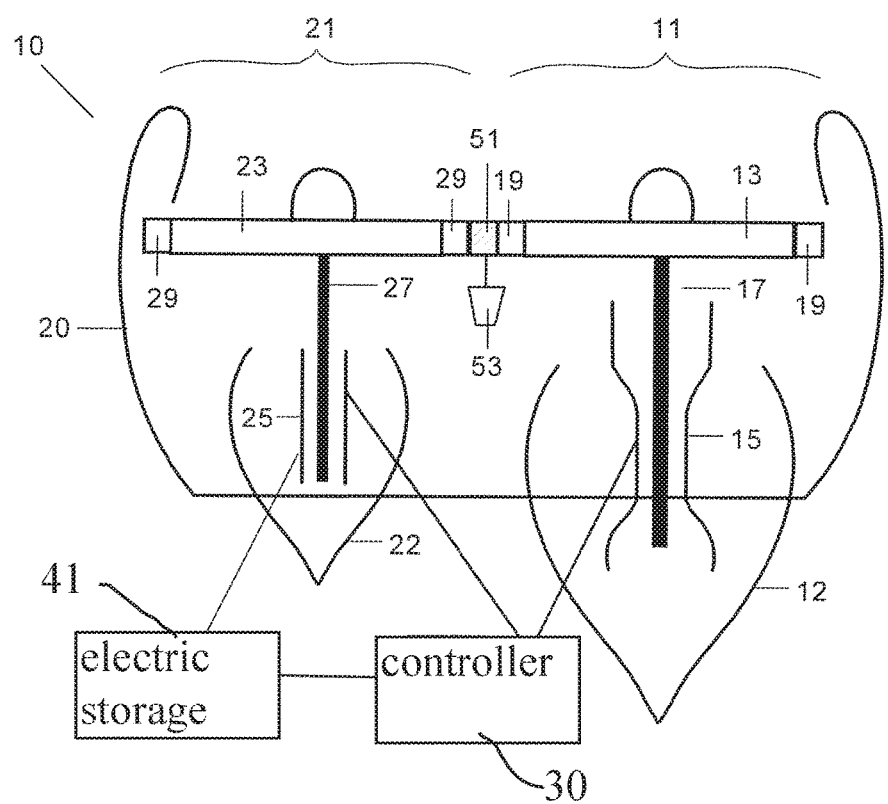
FIG. 1c is a plan view illustrating an embodiment including intermediate gears for engaging/disengaging the two propulsion units.

The embodiment shown in FIG. 1c incorporates an intermediate gear 51 to connect the first and second fans 13, 23 encased by geared rings 19, 29. The intermediate gear 51 can be pulled back by means of a linear actuator 53 so that the power transmission between the first and second fans 13, 23 can be disengaged in cases, for example, of blade rupture, mechanical failure or any other reason.

The first and second fans 13, 23 of the propulsion engine 10 can have the same size as represented in FIGS. 1a and 1b or a different size for meeting particular needs.

Figure 2A:
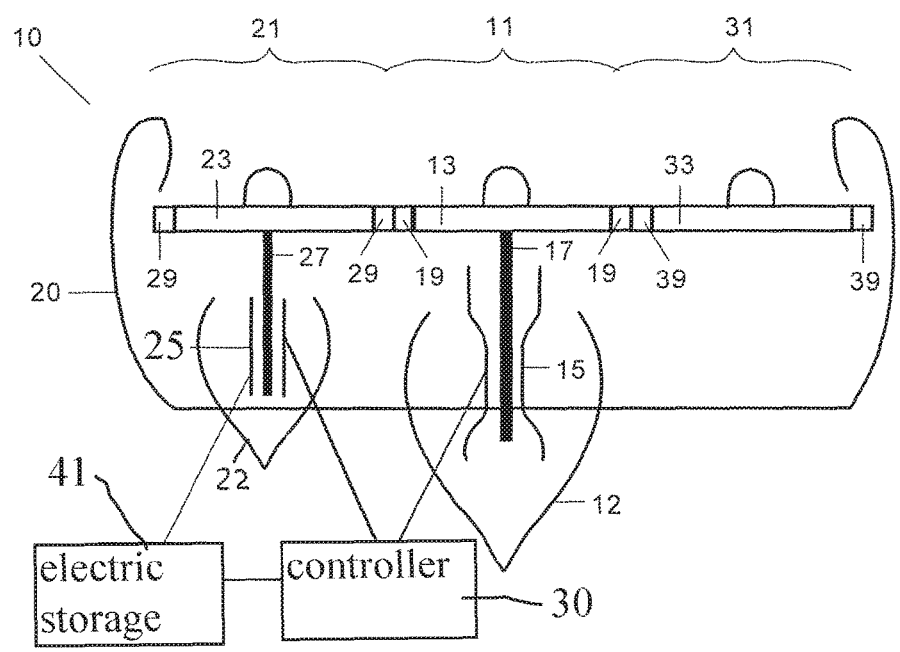
FIGS. 2a and 2b are, respectively, schematic plan and frontal views illustrating an embodiment of the hybrid engine of the invention with three propulsion units.
Figure 2B:
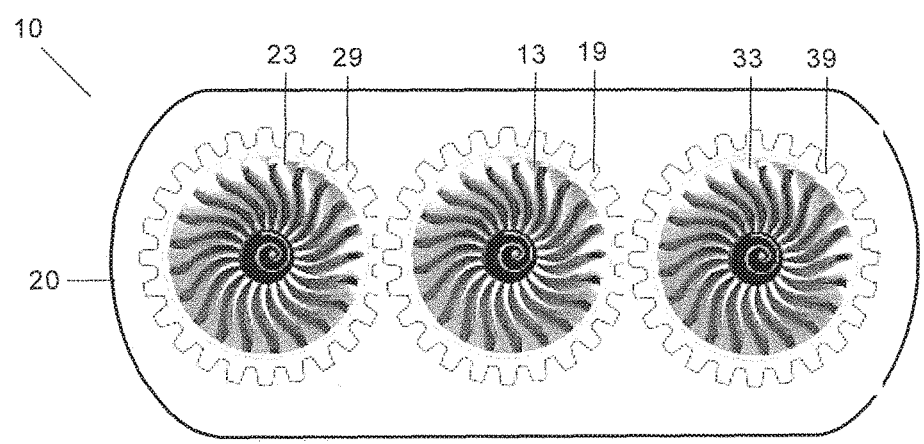

In the embodiment shown in FIGS. 2a and 2b the propulsion engine 10 also includes a third propulsion unit 31 comprising a third fan 33 encased by a geared ring 39 arranged to rotate in conjunction with the first and second fans 13, 23 of the first and second propulsion units 11, 21. Intermediate gears between the first and second fans 13, 23 and between the first and third fans 13, 33 may be incorporated to the propulsion unit for allowing their engaging/disengaging. The control means are arranged for operating the propulsion engine in similar operation modes to those described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

Although the present invention has been described in connection with various embodiments, it will be appreciated from the specification that various combinations of elements, variations or improvements therein may be made, and are within the scope of the invention as defined by the appended claims.

The invention claimed is:

1. A propulsion engine comprising:
    a first propulsion unit including a first fan and a combustion engine driving a first shaft connected to the first fan;
    a second propulsion unit including a second fan connected to a second shaft operatively coupled to an electric machine;
    a electric storage device connected to the electric machine;
    the first and second fans of the first and second propulsion units being encased by geared rings configured to transmit torque between the first and second fans and being arranged to rotate in conjunction when the first and second fans are driven by at least one of said first and second shafts;

the electric machine of the second propulsion unit being arranged for actuating, in combination with the electric storage device, as an electric motor extracting energy from the electric storage device to drive the second shaft and as an electric generator extracting the mechanical energy of the second shaft when the electric machine is driven by the second fan to charge the electric storage device;

a controller connected to the combustion engine, to the electric machine and to the electric storage device and being configured and arranged to control a torque to be supplied to the first and second fans by at least one of the combustion engine and the electric machine acting as the electric motor, and to control a charge of the electric storage device by the electric machine acting as the electric generator.

2. A propulsion engine according to claim 1, further comprising an intermediate gear positioned between the first and second fans to transmit the torque between the first and second fans, said intermediate gear being connected to a linear actuator for engaging and disengaging a mechanical connection between the first and second fans formed by the intermediate gear.

3. A propulsion engine according to claim 1, further comprising a third propulsion unit including a third fan encased by a geared ring arranged to rotate in conjunction with the first and second fans of the first and second propulsion units.

4. A propulsion engine according to claim 3, further comprising an intermediate gear positioned between the third fan and one of the first and second fans to transmit torque between the third fan and the one of the first and second fans, said intermediate gear being connected to a linear actuator for engaging and disengaging a mechanical connection formed by the intermediate gear between the third fan and the one of the first and second fans.

5. A propulsion engine according to claim 3, wherein said third fan is arranged at one side of the first fan.

6. A propulsion engine according to claim 3, wherein said first, second and third fans each have an equal diameter.

7. An aircraft having at least one propulsion engine comprising:
a first propulsion unit including a first fan and a combustion engine driving a first shaft connected to the first fan;
a second propulsion unit including a second fan connected to a second shaft operatively coupled to an electric machine;
an electric storage device connected to the electric machine;
the first and second fans of the first and second propulsion units being encased by geared rings configured to transmit torque between the first and second fans and being arranged to rotate in conjunction when the first and second fans are driven by at least one of said first and second shafts;
the electric machine of the second propulsion unit being arranged for actuating, in combination with the electric storage device, as an electric motor extracting energy from the electric storage device to drive the second shaft and as an electric generator extracting mechanical energy of the second shaft; when the electric machine is driven by the second fan to charge the electric storage device;
a controller connected to the combustion engine, to the electric machine and to the electric storage device and being configured and arranged to control a torque to be supplied to the first and second fans by at least one of the combustion engine and the electric machine acting as the electric motor, and to control a charge of the electric storage device by the electric machine acting as the electric generator.

8. The aircraft according to claim 7, further comprising an intermediate gear positioned between the first and second fans to transmit the torque between the first and second fans, said intermediate gear being connected to a linear actuator for engaging and disengaging a mechanical connection between the first and second fans formed by the intermediate gear.

9. The aircraft according to claim 7, further comprising a third propulsion unit including a third fan encased by a geared ring arranged to rotate in conjunction with the first and second fans of the first and second propulsion units.

10. The aircraft according to claim 9, further comprising an intermediate gear positioned between the third fan and one of the first and second fans to transmit torque between the third fan and the one of the first and second fans, said intermediate gear being connected to a linear actuator for engaging and disengaging a mechanical connection formed by the intermediate gear between the third fan and the one of the first and second fans.

11. The aircraft according to claim 9, wherein said third fan is arranged at one side of the first fan.

12. The aircraft according to claim 9, wherein said first, second and third fans each have an equal diameter.

* * * * *